:::
United States Patent Office 3,153,770
Patented Oct. 20, 1964

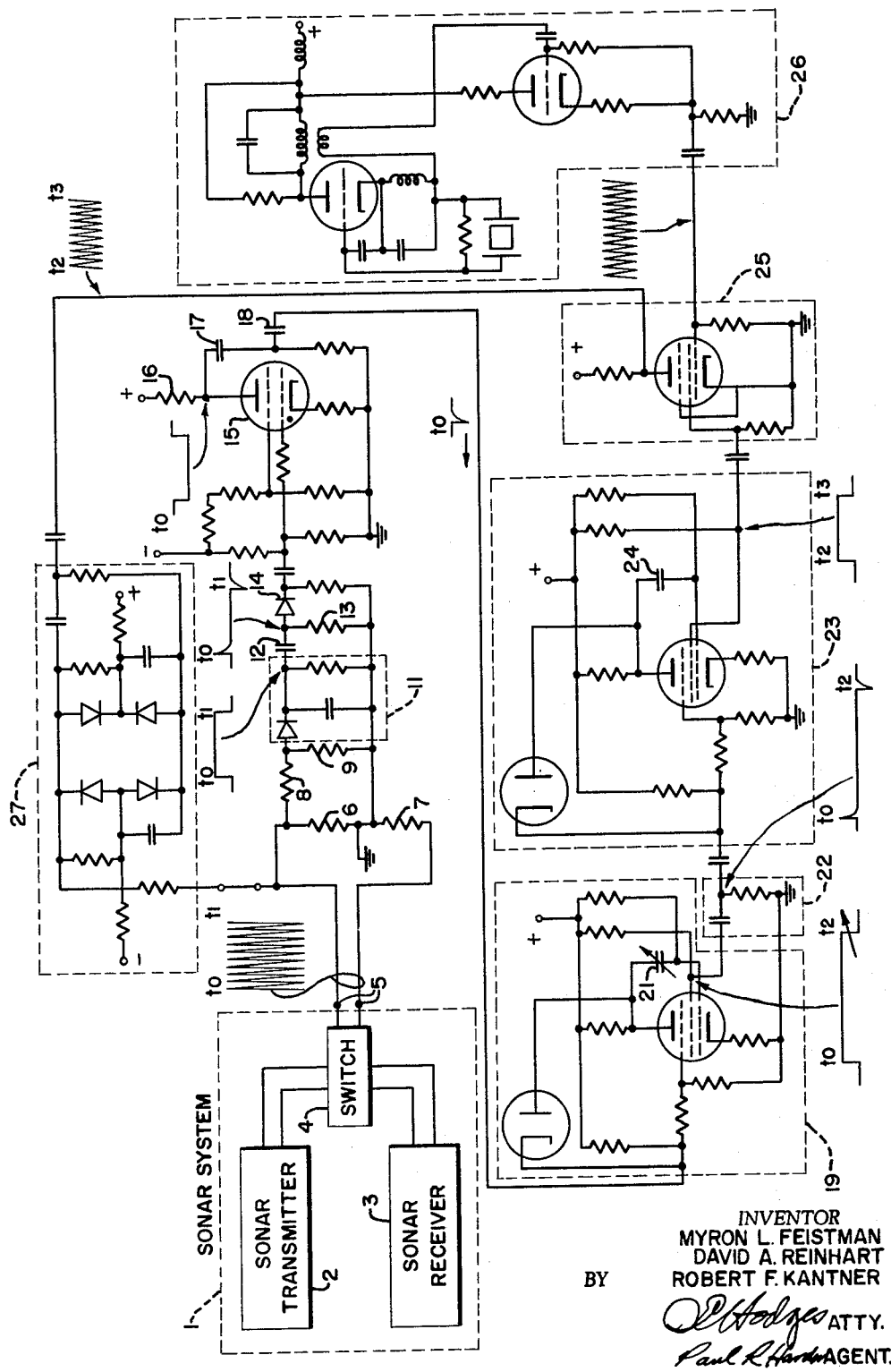

---

3,153,770
SONAR ECHO SIMULATOR
Myron L. Feistman, Cherry Hill, N.J., and David A. Reinhart, Baltimore, and Robert F. Kantner, Glen Burnie, Md., assignors, by mesne assignments, to the United States of America as represented by the Secretary of the Navy
Filed Apr. 3, 1962, Ser. No. 184,862
1 Claim. (Cl. 340—3)

This invention relates generally to a sonar echo simulator and more particularly to a simulator which receives directly the output of a sonar transmitter, ejects a known delay, and feeds back to the sonar receiver directly an attenuated signal delayed in time with respect to the transmitted signal and which is representative of the target depth or distance to be displayed by the measuring equipment.

In the past, to test and calibrate the measuring equipment in a sonar system it has been necessary to employ sonar transducers and to utilize an object having a known distance from the sonar system, or to use a water tank having a known depth. The general purpose of this invention is to provide an echo simulator which may be built into the sonar system or which, if desired, may be plugged into the system and utilized to calibrate the measuring equipment without the use of sonar transducers, depth tanks or without the necessity of utilizing an object having a known range.

Briefly, the simulator receives directly the high voltage, high frequency output of the sonar transmitter, attenuates and detects this signal, adds a known and desired delay to the detected signal, then feeds back to the sonar receiver a signal having the initial frequency of the transmitter, attenuated and delayed by an amount representative of the water depth or target distance to be displayed by the measuring equipment. Therefore, knowing the actual delay and the represented water depth or target distance corresponding thereto the measuring equipment may readily be calibrated.

An object of this invention is to provide a sonar echo simulator which does not necessitate the use of sonar transducers.

Another object is to provide an echo simulator which does not necessitate the use of a water tank or target having a known distance.

Still another object of the invention is to provide a sonar echo simulator which accepts the output of a sonar transmitter and feeds back a signal delayed in time which is representative of a water depth or target distance to be displayed by the sonar measuring equipment.

A further object is the provision of a sonar echo simulator, the delayed time of which may readily be varied.

Other objects and many of the attendant advantages of this invention will be more readily appreciated as the same becomes better understood by reference to the following detailed description when considered in connection with the accompanying drawing and wherein:

The single figure illustrates a circuit diagram of a preferred embodiment of the invention.

As is well known to those skilled in the art, the transducer of a sonar system may be used not only to transmit the energy pulse output of the sonar transmitter but may also be utilized to receive the echo pulse which is transmitted to the sonar receiver by appropriate switching within the sonar system. Therefore, a common coaxial cable is utilized between the transmitter and the transducer and between the transducer and the receiver within the sonar system may be utilized to provide both the input and the output to the sonar echo simulator which comprises this invention.

Referring now to the drawing there is illustrated a sonar system 1 comprising a sonar transmitter 2, a sonar receiver 3, and a switch mechanism 4 for selectively connecting the transmitter or the receiver to a pair of terminals 5, such for example, as the coaxial cable connected to a transducer. The output of the transmitter generally takes the form of a high voltage, high frequency pulse as illustrated by the wave form adjacent terminals 5. This output is applied across resistors 6 and 7 to provide a balanced input to the simulator.

The input signal is attenuated across resistors 8 and 9 and is detected by the diode and filter circuit forming the detector 11, the output envelope thereof having been illustrated on the drawing. The detected pulse is differentiated by capacitor 12 and resistor 13 and the positive spike is fed through diode 14 to trigger the thyratron 15.

Thyratron 15 fires substantially at time $t_0$, is utilized to invert the positive spike from the differentiation circuit and to provide a signal of sufficient amplitude to trigger the first phantastron circuit as will hereinafter become more apparent. When thyratron 15 fires, the plate voltage decreases due to the voltage drop across the plate resistor 16 and will remain conductive depending upon the discharge time of capacitor 17 as is apparent to one skilled in the art. A high voltage negative spike is, therefore, fed through capacitor 18 at time $t_0$ to trigger the variable phantastron circuit 19 which provides the desired time delay.

The output of the phantastron 19 is a positive pulse commencing at time $t_0$, the duration of which is dependent upon the value of variable capacitor 21, the pulse ending at time $t_2$. The output pulse of phantastron 19 is applied to a differentiation circuit 22, the positive spike of which occurs at substantially time $t_0$ and the negative spike occurs at time $t_2$ and accordingly the delay between the positive and the negative spikes represent the delay time set by capacitor 21.

The output of differentiation circuit 22 is applied as the input to the phantastron 23 and since the circuit may be triggered only by a negative spike, the positive spike at $t_0$ has no effect thereon. Therefore, at time $t_2$, the delay time, phantastron 23 is triggered and provides a positive output pulse the duration of which is dependent upon capacitor 24. The value of capacitor 24 is arranged such that the output pulse of phantastron 23 is of the same duration as the input pulse received from the sonar transmitter, that is, the time period from $t_2$ to $t_3$ equals the time period from $t_0$ to $t_1$.

The output of phantastron 23 is applied to control gating circuit 25 to which is fed from the external oscillator 26 a continuous signal of the same frequency as that of the sonar transmitter signal originally applied to the input of the simulator. The output of gating circuit 25, is, therefore, a packet of energy having the same frequency and duration as was the input pulse from the transmitter but delayed in time and greatly attenuated. The output of gating circuit 25 is fed through isolation circuitry 27 back to terminal 5 and into the sonar system where it is received and the delay measured.

In practice, the output of the sonar transmitter may be, for example, an 800-volt, 100 microsecond packet of one megacycle energy which is attenuated to about 60 volts peak-to-peak across resistors 8 and 9 and the output of the detector 11 is a 100 microsecond pulse commencing at substantially time $t_0$. The positive spike at $t_0$ from differentiation circuit 12, 13 is inverted by thyratron 15 and applied to trigger phantastron 19, the output pulse of which commences at substantially $t_0$ and the duration of which represents the desired time delay. The negative spike from differentiation circuit 22 is utilized to trigger a second phantastron circuit 23 which has a fixed time duration of the same duration as the transmitter pulse, in this example, 100 microseconds.

Therefore, the output of phantastron 23 commences at time $t_2$, the delay time, and has a duration of 100 microseconds during which gating circuit 25 is conductive. The crystal oscillator 26 is arranged to have the same frequency as the sonar transmitter, that is, one megacycle, and the output of gating circuit 25 is therefore a 100 microsecond packet of one megacycle energy delayed in time by the period set by phantastron 19. This packet of energy is fed through isolation circuit 27, which provides a certain amount of attenuation, back to the terminals 5 and to the receiver of the sonar system. While the isolation circuitry provides a certain amount of attenuation, the main purpose is to prevent the high voltage input pulse from the transmitter from being fed to the gating circuit 25 which may cause possible damage thereto.

The positive and negative spikes from differentiation circuit 22 provide a means of determining the exact delay produced by the sonar echo simulator and which may readily be compared with that shown by the sonar measuring system for calibration thereof. It is obvious that the simulator illustrated may be built into the sonar system as a self-contained unit or may be provided as a separate test apparatus which may readily be connected to the sonar system through the transducer leads.

Although specific values of input voltage, pulse duration, and frequency were used in the above example, it should be understood that the illustrated circuitry has several parameters that may easily be varied allowing the circuit to be used for a wide variety of applications.

Obviously many modifications and variations of the present invention are possible in the light of the above teachings. It is therefore to be understood, that within the scope of the appended claim, the invention may be practiced otherwise than as specifically described.

What is claimed as new and desired to be secured by Letters Patent of the United States is:

A sonar system simulator comprising a high frequency transmitter having a pulse output, detecting means connected to said transmitter for providing a detected pulse coincident with the pulse output of said transmitter, differentiation means for providing a voltage spike at the leading edge of said detected pulse, inverting and amplifying means connected to said differentiation means for inverting and amplifying said voltage spike, selectively variable pulse forming means connected to said inverting and amplifying means so as to be fired by the inverted voltage spike to provide a delay pulse of predetermined duration indicative of the distance to a target, second differentiating means connected to said selectively variable pulse forming means for providing a voltage spike at the leading edge and at the trailing edge of said delay pulse, pulse forming means connected to said differentiating means so as to be fired by the voltage spike at the trailing edge of said delayed pulse to provide a gating pulse of fixed duration equal to the duration of the pulse output of the transmitter, an oscillator having a frequency equal to the high frequency transmitter, gating means connected to said oscillator and to said last-named pulse forming means for gating the output of said oscillator during said gating pulse, a receiver, and isolation circuit means connected to said gating means and to said receiver for applying the gated output of said oscillator to said receiver whereby the leading edge of said gated pulse received at said receiver trails the leading edge of the output of said transmitter by the duration of said delay pulse.

References Cited in the file of this patent

UNITED STATES PATENTS

| | | |
|---|---|---|
| 2,400,796 | Watts et al. | May 21, 1946 |
| 2,522,541 | Saxton et al. | Sept. 19, 1950 |
| 2,780,011 | Pierce et al. | Feb. 5, 1957 |
| 2,883,661 | McCall | Apr. 21, 1959 |
| 2,962,584 | Lackoff | Nov. 29, 1960 |

OTHER REFERENCES

"Sonar Target Simulator" by Cologne et al., Electronics, March 1955, (p. 167).